(12) United States Patent
Rao et al.

(10) Patent No.: US 11,842,203 B2
(45) Date of Patent: Dec. 12, 2023

(54) MANAGING APPLICATIONS FOR SENSORS (71) Applicant: NEC Laboratories America, Inc., Princeton, NJ (US)

(72) Inventors: Kunal Rao, Monroe, NJ (US); Giuseppe Coviello, Princeton, NJ (US); Srimat Chakradhar, Manalapan, NJ (US)

(73) Assignee: NEC Corporation, Tokyo (JP)

( * ) Notice: Subject to any disclaimer, the term of this patent is extended or adjusted under 35 U.S.C. 154(b) by 390 days.

(21) Appl. No.: 17/177,998

(22) Filed: Feb. 17, 2021

(65) Prior Publication Data

US 2021/0263752 A1 Aug. 26, 2021

Related U.S. Application Data

(60) Provisional application No. 62/979,493, filed on Feb. 21, 2020.

(51) Int. Cl.
| | |
|---|---|
| *G06F 9/46* | (2006.01) |
| *G06F 9/445* | (2018.01) |
| *G06F 9/50* | (2006.01) |
| *G06F 9/54* | (2006.01) |
| *G06F 8/65* | (2018.01) |
| *G06F 9/48* | (2006.01) |
| *G06T 7/20* | (2017.01) |
| *H04N 23/90* | (2023.01) |
| *H04N 23/617* | (2023.01) |
| *H04N 23/661* | (2023.01) |
| *G06V 40/16* | (2022.01) |

(52) U.S. Cl.
CPC ............ *G06F 9/44505* (2013.01); *G06F 8/65* (2013.01); *G06F 9/4843* (2013.01); *G06F 9/5027* (2013.01); *G06F 9/54* (2013.01); *G06T 7/20* (2013.01); *H04N 23/617* (2023.01); *H04N 23/661* (2023.01); *H04N 23/90* (2023.01); *G06T 2207/30201* (2013.01); *G06V 40/172* (2022.01)

(58) Field of Classification Search
CPC .. G06F 9/44505; G06F 9/4843; G06F 9/5027; G06F 9/54; G06F 8/65
See application file for complete search history.

(56) References Cited

U.S. PATENT DOCUMENTS

| | | | |
|---|---|---|---|
| 2015/0067176 A1* | 3/2015 | Dubois | ............... H04W 12/086 709/227 |
| 2019/0138934 A1 | 5/2019 | Prakash et al. | |
| 2019/0140906 A1* | 5/2019 | Furuichi | ............. H04L 41/0866 |

OTHER PUBLICATIONS

Thomas Kwok et al., "Resource Calculations with Constraints, and Placement of Tenants and Instances for Multi-tenant SaaS Applications", in International Conference on Service-Oriented Computer (ICSOC) 2008, pp. 633-648 (2008)—Sections 1-8.

* cited by examiner

*Primary Examiner* — Diem K Cao
(74) *Attorney, Agent, or Firm* — Joseph Kolodka (57) ABSTRACT

A method is provided for managing applications for sensors. In one embodiment, the method includes loading a plurality of applications and links for communicating with a plurality of sensors on a platform having an interface for entry of a requested use case; and copying a configuration from a grouping of application instances being applied to a first sensor performing in a function comprising of the requested use case. The method may further include applying the configuration for the grouping of application instances to a second set of sensors to automatically conform the plurality of sensors on the platform to perform the requested use case.

13 Claims, 11 Drawing Sheets

FIG. 11

MANAGING APPLICATIONS FOR SENSORS

RELATED APPLICATION INFORMATION

This application claims priority to 62/979,493, filed on Feb. 21, 2020, incorporated herein by reference in its entirety.

BACKGROUND

Technical Field

The present invention relates to managing sensors and more particularly how applications can be applied to sensors.

Description of the Related Art

Platforms to manage sensors, applications, application instances, worker nodes to run application instances, users, roles, databases, and data access authorization are already available. However, these platforms are targeted towards managing individual resources and support operations to manage resources one at a time. In a deployment of such a platform, groups of resources may have to be managed and it can be a cumbersome and non-trivial task. This can especially be the case when the deployment involves a lot of sensors and application instances to be managed on those sensors.

SUMMARY

According to an aspect of the present invention, a method is provided for managing applications for sensors. In one embodiment, the method includes loading a plurality of applications and links for communicating with a plurality of sensors on a platform having an interface for entry of a requested use case, the platform including a master node for system level management and worker nodes that are configured for scheduling modification of the application instances being applied to the sensors, the master node determining a presence of shared application instances; and copying a configuration from a grouping of application instances being applied to a first sensor performing in a function comprising of the requested use case, the copying including scheduling working nodes to run shared application instances in providing services towards the requested use. The method may further include applying the configuration for the grouping of application instances to a second set of sensors to automatically conform the plurality of sensors on the platform to perform the requested use case, wherein applying the configuration of application instances includes co-allocation of shared application instances on the scheduled working node.

According to another aspect of the present invention, a system is provided for managing applications for sensors. The system may include a platform for storing a plurality of applications and links for communicating with a plurality of sensors, the platform having an interface for entry of a requested use case, the platform including a master node for system level management and worker nodes that are configured for scheduling modification of the application instances being applied to the sensors, the master node determining a presence of shared application instances. The system may further include an application manager including a plurality of instructions stored on memory for execution by a hardware processor for copying a configuration from a grouping of application instances being applied to a first sensor performing in a function comprising of the requested use case, the copying including scheduling working nodes to run shared application instances in providing services towards the requested use and applying the configuration for the grouping of application instances to a second set of sensors to automatically conform the plurality of sensors on the platform to perform the requested use case.

In another aspect, a computer program product is provided for managing applications for sensors. The computer program product includes a computer readable storage medium having computer readable program code embodied therewith, the program instructions executable by a processor to cause the processor to load, using the processor, a plurality of applications and links for communicating with a plurality of sensors on a platform having an interface for entry of a requested use case, the platform including a master node for system level management and worker nodes that are configured for scheduling modification of the application instances being applied to the sensors, the master node determining a presence of shared application instances. The computer program produce can also copy, using the processor, a configuration from a grouping of application instances being applied to a first sensor performing in a function comprising of the requested use case, the copying including scheduling working nodes to run shared application instances in providing services towards the requested use. The computer program product can also apply, using the processor, the configuration for the grouping of application instances to a second set of sensors to automatically conform the plurality of sensors on the platform to perform the requested use case, wherein applying the configuration of application instances includes co-allocation of shared application instances on the scheduled working node.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The methods, systems and computer program products that are described herein can manage specific application instances for a set of sensors. Management can include creating, scheduling, starting/stopping/restarting, updating, deleting and retrieving specific application instances for a set of sensors.

The methods, systems and computer program products manage application usage by multiple sensors by providing a software layer for managing specific instances of application usage to specific sensors, which uses an underlying platform to manage the plurality of sensors available to the system, the plurality of applications available to the system, and management of the application resources, such as databases, and interfaces for users and controlling data access with respect to the applications and/or sensors.

The methods and systems described herein provide an ability to create specific application instances for a set of sensors. In some embodiments, creating the specific application instances for the set of sensors can be accomplished by copying same application instance configuration from one sensor and apply that configuration to another like sensor. The systems further include the ability to automatically schedule, e.g., select and assign worker nodes, for newly created application instances.

Capabilities are also provided for updating specific application instances for a set of sensors. In some embodiments, the systems, methods and computer program products that are described herein update specific application instances configuration for a set of sensors by copying same application instance configuration from another sensor.

The methods and systems described herein provide can also provide the ability to set status, e.g., start/stop/restart, for specific application instances for a set of sensors; the ability to delete specific application instances for a set of sensors; and the ability to retrieve specific application instances, along with status, for a set of sensors.

Figure 1:
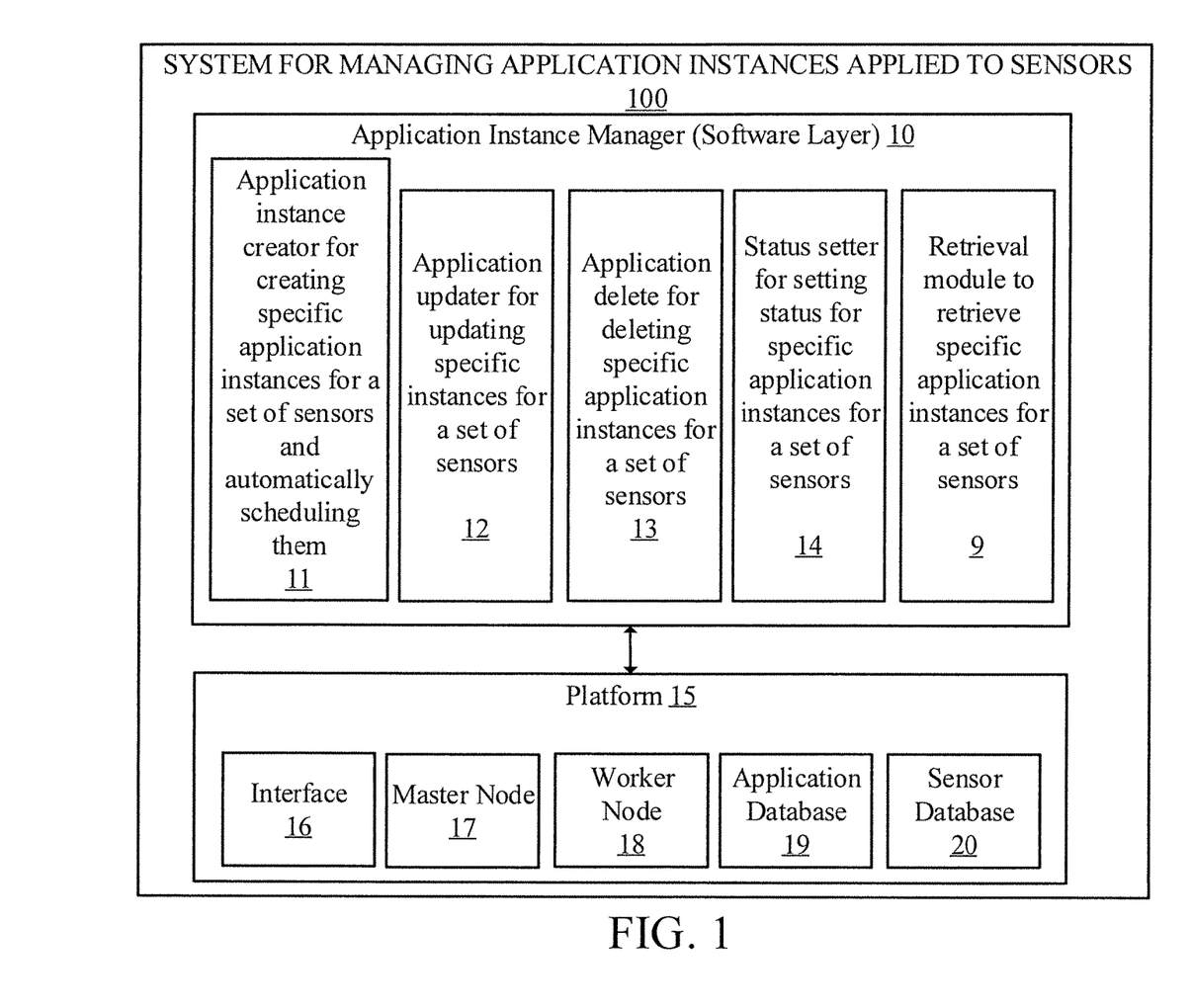
FIG. 1 is a block/flow diagram illustrating a high-level system architecture for managing specific application instances for a set of sensors, in accordance with an embodiment of the present invention.

FIG. 1 is a block/flow diagram illustrating a high-level system architecture for managing specific application instances for a set of sensors. The system 100 for managing specific application instances for a set of sensors may include a platform layer 10 and software layer 15, in which the software layer 15 is on top of the platform 10. The system 100 is for managing specific application instances for a set of sensors. The software layer may also be referred to as the application instance manager.

Figure 2:
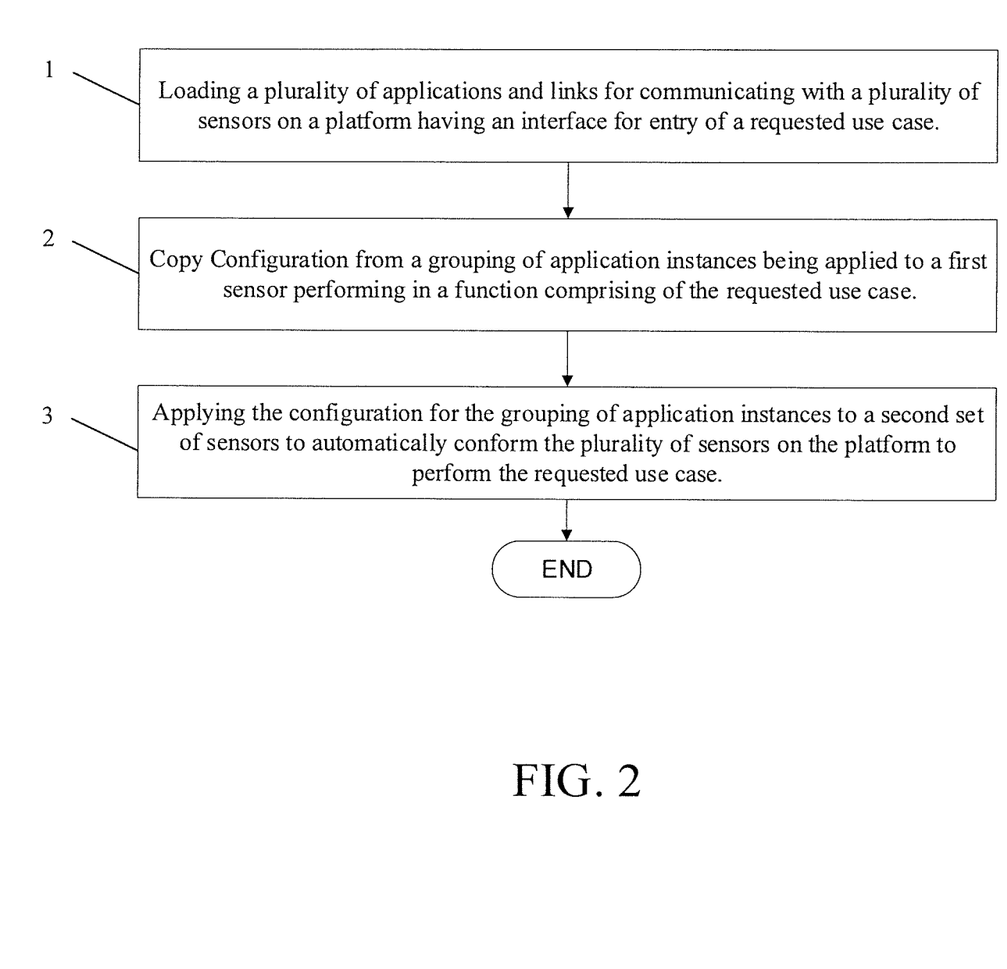
FIG. 2 is a block/flow diagram illustrating a high-level method for managing specific application instances for a set of sensors, in accordance with an embodiment of the present invention.

FIG. 2 is a block/flow diagram illustrating a high-level method for managing specific application instances for a set of sensors. The method may include loading a plurality of applications and links for communicating with a plurality of sensors on the platform 10 having an interface 16 for entry of a requested use case at block 1. The application instance manager (which is also referred to as a software layer 10) can copy a configuration from a grouping of application instances being applied to a first sensor performing in a function comprising of the requested use case at block 2. At block 3, the application instance manager (also referred to as software layer 10) applies the configuration for the grouping of application instances to a second set of sensors to automatically conform the plurality of sensors on the platform to perform the requested use case. The plurality of sensors on the platform being conformed to perform the requested use case by applying the configuration for the grouping of applications instances copied from the first sensor reduces inter application communication latency for the plurality of applications on the platform.

The platform layer 10 provides HTTP(S)-based RESTful APIs 16 to manage sensors, applications, application instances, worker nodes to run application instances, users, roles, databases, data access authorization, etc. A RESTful API 16 is an architectural style for an application program interface (API) that uses HTTP requests to access and use data. That data can be used to get, put, post and delete data types, which refers to the reading, updating, creating and deleting of operations concerning resources.

For a typical deployment, there is a master node 17 and a plurality of worker nodes 18. Master node 17 typically manages "system" level data and applications, while worker nodes 18 typically manage "non-system" level data and applications. Each worker node 18 has a daemon to manage applications to run on the worker node 18 and periodically communicates the health of the worker node 18 with the master node 17. A "daemon" is a computer program that runs as a background process.

Once the master and worker nodes 17, 18 are setup, applications are loaded in the platform and sensors are on-boarded. The applications may be loaded into an application database 19, and data for addressing the sensors may be stored in a sensor database 20. Each application acts as a micro-service and provides a specific functionality. Example applications can include face detection from video frames; face matching between face images taken from video frames and reference faces stored in a database; and tracking applications for tracking the location and travel pathways of individuals having faces that were measured from the video frames and matched.

Instances of applications are created and run to provide the micro-service associated with the application. Multiple application instances can be chained together in the form of a topology to solve a "usen case". The platform allows creating instances of such "use cases" by specifying configuration of individual application and worker node on which it is supposed to be run. An example of a "use case" could be tracking individuals as they travel between physical spaces, e.g., buildings or within regions of the interior of buildings.

On a single sensor, the deployment may include multiple "use cases", which may "share" certain micro-services. The platform 10 automatically identifies application instances that can be shared by checking the configuration of the instances and creates only one instance of the application. A typical deployment includes multiple such "usecase" instances deployed on several sensors.

Still referring to FIG. 1, the software layer 10 exposes HTTP(S)-based RESTful APIs and internally uses the underlying platform 15 to manage specific application instances for a set of sensors. The various functions supported by the software layer 10 include an application instance creator 11 to create specific application instances for a set of sensors and automatically schedule them. Additionally, the software layer 10 further includes an application updater 12 for updating specific application instances for a set of sensors. The software layer 10 further includes an application delete 13 for deleting specific application instances for a set of sensors. The software layer 10 additionally includes a status setter 14 in order to set status for specific application instances for a set of sensors. Additionally, the software layer 10 also includes a retrieval module 9 for retrieving specific application instances for a set of sensors.

The software layer 10 may be stateless. No state/data is maintained within the software layer. The software layer 10 acts as an intermediate layer to provide the above listed functionality. All state and data directed to the applications and sensors is ultimately maintained by the platform 15.

Figure 3:
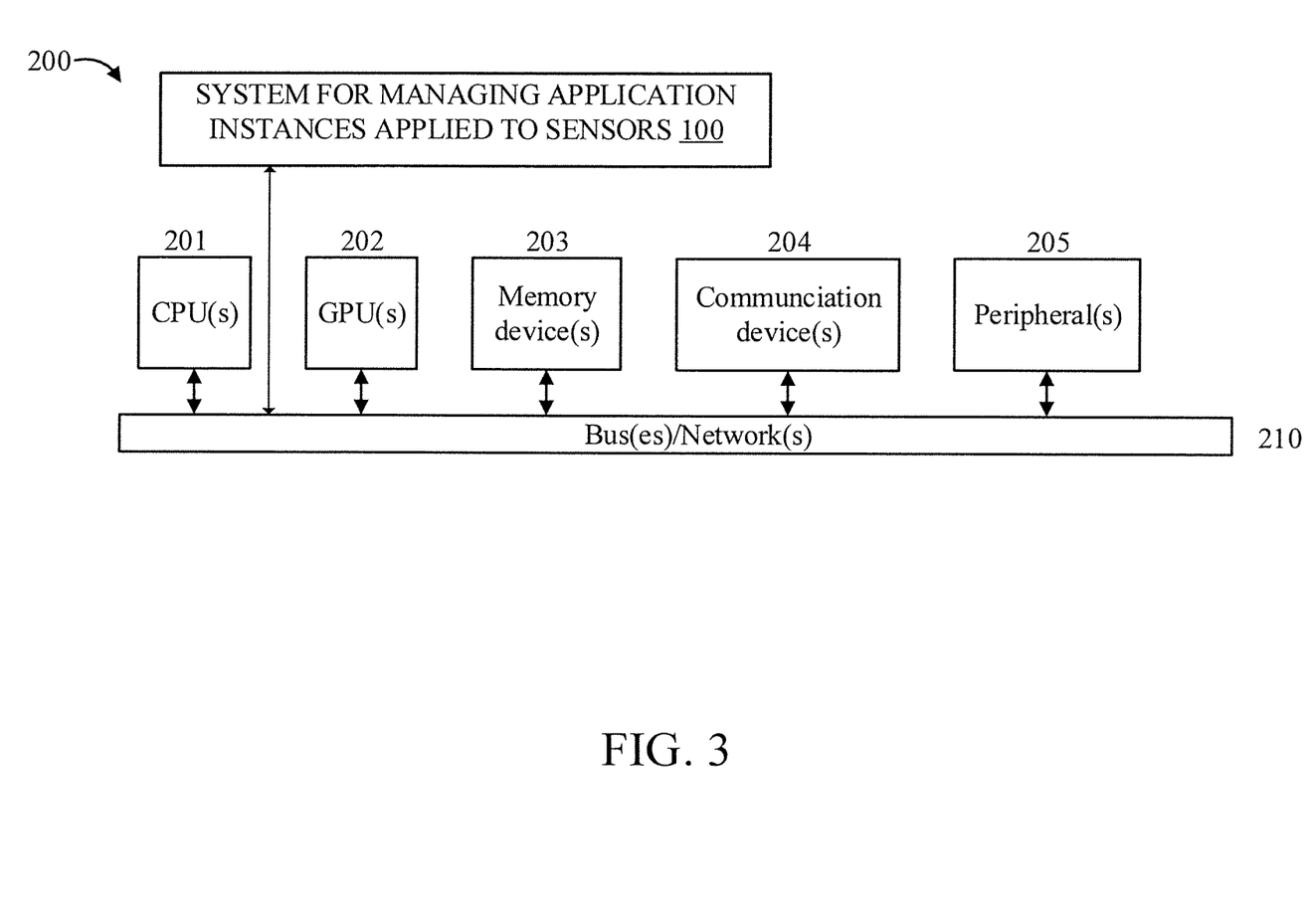
FIG. 3 is a block diagram showing an exemplary processing system that can incorporates the system architecture for managing application instances for a set of sensors, in accordance with an embodiment of the present invention.

FIG. 3 is a block diagram showing an exemplary processing system 200 that can incorporate the system 100 including the architecture for managing a specific application instances for a set of sensors that is depicted in FIG. 1.

The processing system 200 includes a set of processing units (e.g., CPUs) 201, a set of GPUs 202, a set of memory devices 203, a set of communication devices 204, and set of peripherals 205. The CPUs 201 can be single or multi-core CPUs. The GPUs 202 can be single or multi-core GPUs. The one or more memory devices 203 can include caches, RAMs, ROMs, and other memories (flash, optical, magnetic, etc.). The communication devices 204 can include wireless and/or wired communication devices (e.g., network (e.g., WIFI, etc.) adapters, etc.). The peripherals 205 can include a display device, a user input device, a printer, an imaging device, and so forth. Elements of processing system 200 are connected by one or more buses or networks (collectively denoted by the figure reference numeral 110). In some embodiments, the system for managing application instances can employ a hardware processor that can be provided by the CPU 201 to perform the methods described with reference to FIGS. 2 and 4-10.

In an embodiment, memory devices 203 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention. The memory devices 203 may store instructions for executing (in combination with the hardware processor) the steps of the method in FIGS. 2 and 4-10, which may be effectuated through the system for managing application instances 100.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 200 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 200.

Figure 4:
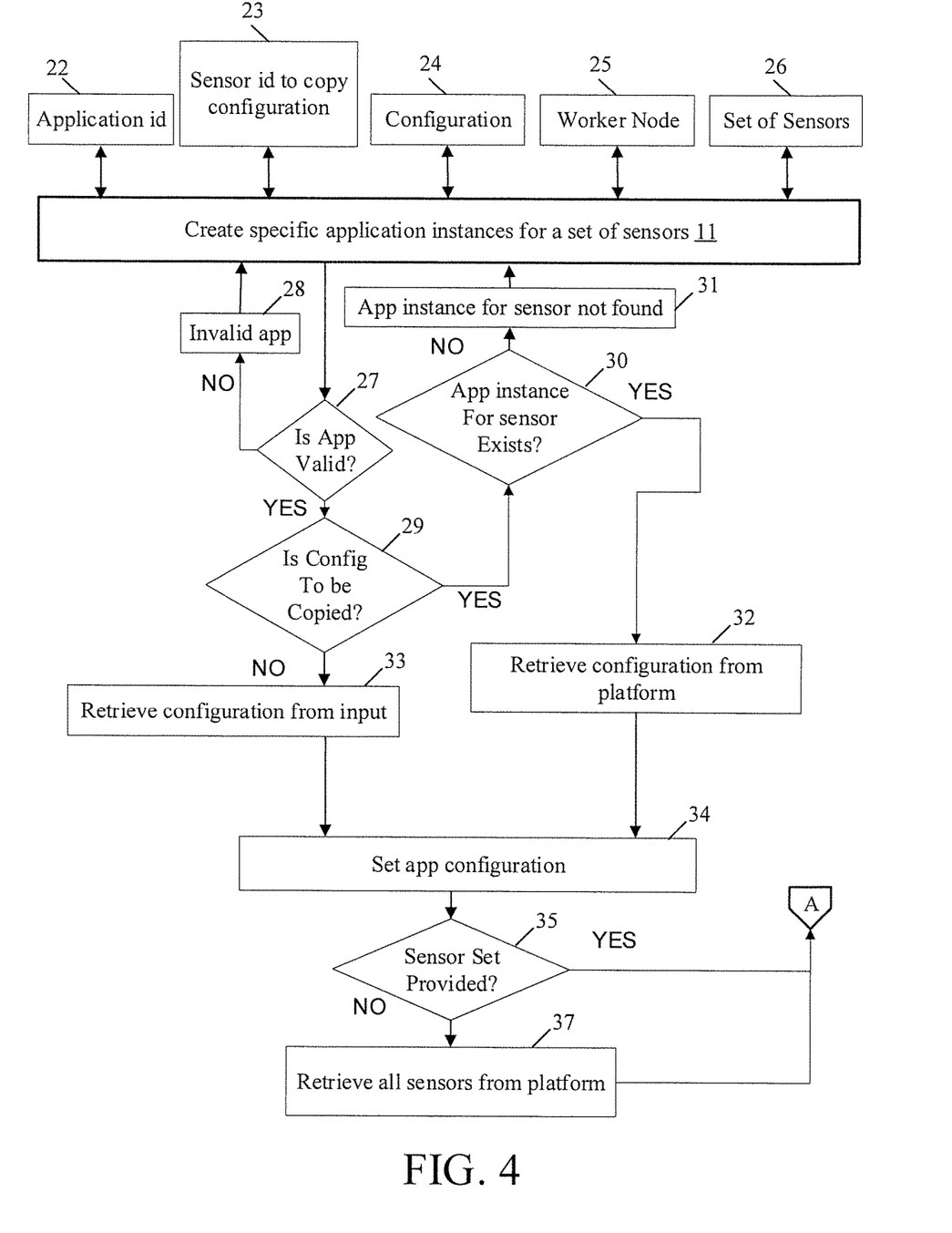
FIG. 4 is part 1 of a flow chart of the execution procedure that is followed by the application instance creator of the software layer for the system depicted in FIG. 1, in accordance with one embodiment of the present disclosure.
Figure 5:
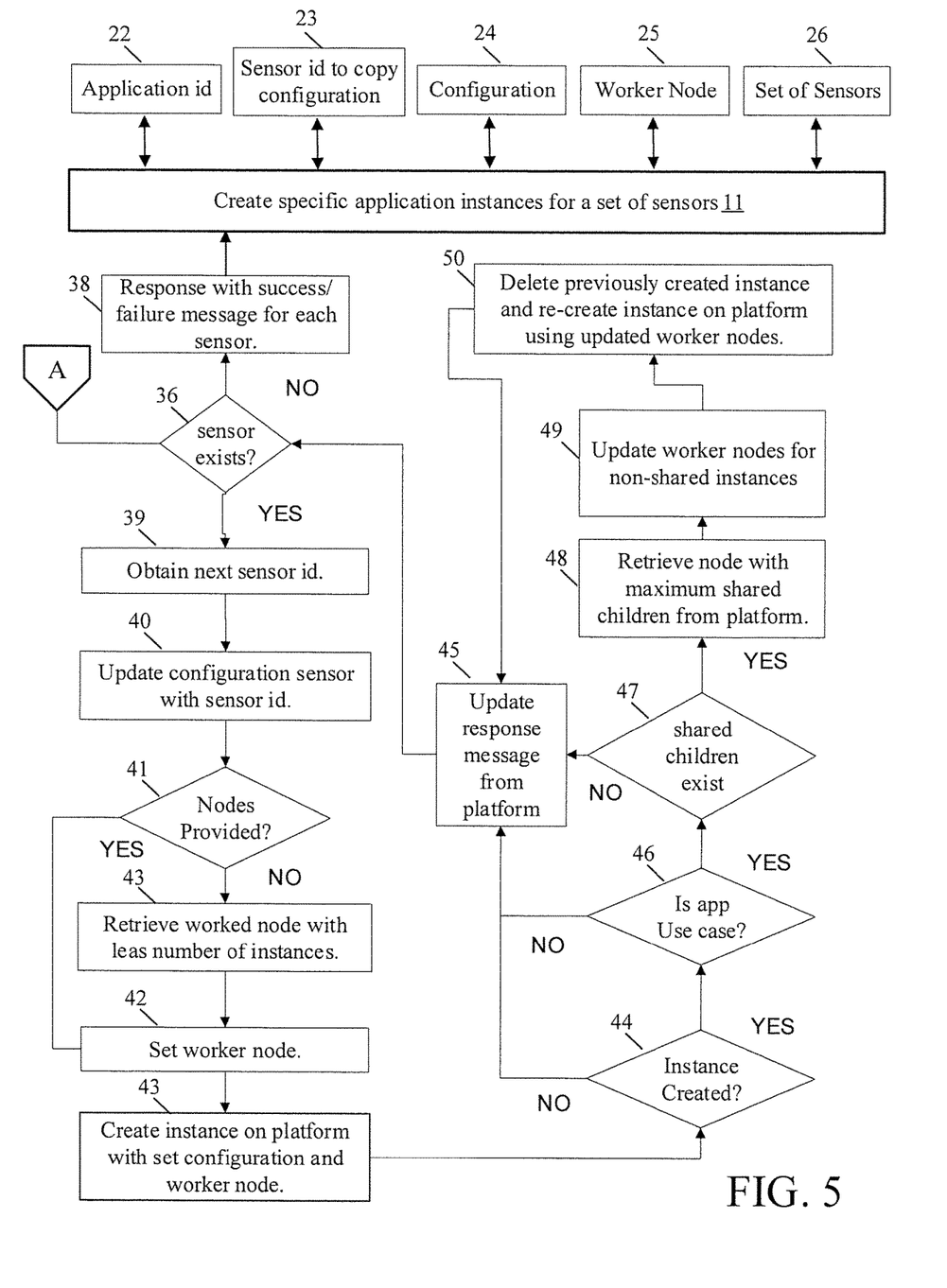
FIG. 5 is part 2 of the flow chart that begins in FIG. 4 for the execution procedure that is followed by the application instance creator of the software layer for the system depicted in FIG. 1, in accordance with one embodiment of the present disclosure.

FIGS. 4 and 5 illustrate one embodiment of the execution procedure that is followed by the software layer, e.g., followed by the application instance creator 11 of the software layer 10. The software layer 10 exposes HTTP(S)-based RESTful API to create specific application instances for a set of sensors and automatically schedule them. The input to the API includes of the "Application id" 22, "Sensor id to copy configuration from" 23, "Configuration" 24, "Worker node" 25 and "Set of sensors" 26.

Once the input is received, a first check is performed to see if the application is valid or not at block 27. In some embodiments, validity of the application can be confirmed by checking if the provided "Application id" is loaded in the platform.

If the provided "Application id" is not loaded in the platform, then the request includes an invalid application id and the response is returned with appropriate error message, indicating that the provided "Application id" is invalid at block 28.

If the provided "Application id" is valid at block 27, then a check is performed to see if "Sensor id to copy configuration from" is provided or not at block 29. If "Sensor id to copy configuration from" is provided, then the platform is checked to see if there is any instance of the provided "Application id" associated with the sensor at block 30.

If no instance, or more than one instance, is found on the platform at block 30, then response is returned with appropriate error message, indicating that either no or more than one application instance corresponding to the sensor, exists within the platform at block 31. If an instance of the provided "Application id" is found on the platform associated with the sensor id provided in "Sensor id to copy configuration from" at block 30, then the configuration of the specific instance is retrieved from the platform at block 32.

If "Sensor id to copy configuration from" is not provided at block 29, then "Configuration" from the input is retrieved at block 33. Configuration to use for the creation of application instance is set at block 34. This could either be copied from an existing instance or could be the one provided with the input.

At block 35 of FIG. 4, a check is then performed to see if "Set of sensors" is provided in the input or not. If it is provided, then our software layer jumps to block 36 of FIG. 5. The process flow depicted in FIG. 4 continues to the process flow depicted in FIG. 5 through the page connector "A". Block 36 includes a check to determine if the sensor exists. If a "Set of sensors" is provided at block 35, then it is assumed that the operation is to be carried out for ALL sensors in the platform and all sensors from the platform are retrieved at block 37.

Check is performed to see if there are sensors for which the application instances need to be created. All sensors are processed one by one until no more exists. When there are no more sensors to process, our software layer jumps to block 38.

Referring to block 39 of FIG. 5, a next sensor id to process is obtained from the "set" of sensors, which could be either provided with the input or retrieved from the platform. The configuration to be used for creating the instances is then updated with the selected sensor id at block 40. A check is then performed to see if "Worker node" on which the application instances need to be created is provided or not at block 41. If it is provided, then our software layer jumps to block 42. If the "Worker node" is not provided at block 41, then the worker node with least number of instances, e.g., a least loaded node is retrieved from the platform at block 43. Any other node selection policy can be used here to automatically schedule the application instances. The one chosen by our software layer is to pick the least loaded node, so as to balance the workload.

Worker node to be used for creating the application instance for the selected sensor is set. This could either be provided in the input or automatically selected by our software layer.

An instance of the application for the selected sensor is then created at block 43 on the platform using the set configuration (from block 40) and the worker node (from block 42).

At block 44 of FIG. 5, if a check is then performed to see if the instance was successfully created on the platform or not. If the instance was not created, then our software layer jumps to block 45. Bock 45 includes an update response message from the platform. If the instance was successfully created at block 44, then check is performed to see if the application is a "use case" block 46, e.g., the check comprises of multiple children application instances or not at block 47. If the application is not a "use case", then our software layer jumps to block 45. If the application is a "use case", then check is performed to see if the platform automatically "shared" some of the application instances of the "use case" with existing one, in which case no new application instance would have been created. If the platform did not "share" any application instance, then our software layer jumps to block 45.

If the platform did "share" some of the application instances of the "usecase", then the worker node for each shared instance is retrieved from the platform and the one with maximum shared instance is obtained at block 48.

Referring to block 49 of FIG. 5, the worker node for all the non-shared instances of the use case is then updated to the use case that is obtained in block 48.

The previously created instance of the "use case" is then deleted from the platform at block 50, and a new instance with the updated worker node is created on the platform. This is done so that all application instances of a "use case" are co-allocated on the same worker node—to reduce inter-application communication latency. Any other policy can be applied here as per the need of application instances.

Response message from the platform, including the created application instance id for the selected sensor is then updated in the final response to be sent. Our software layer then jumps to block 38.

Final response with success/failure message i.e. whether the application instance was successfully created or not with details of success/failure for each sensor is then formulated and sent back as response to the request.

Figure 6:
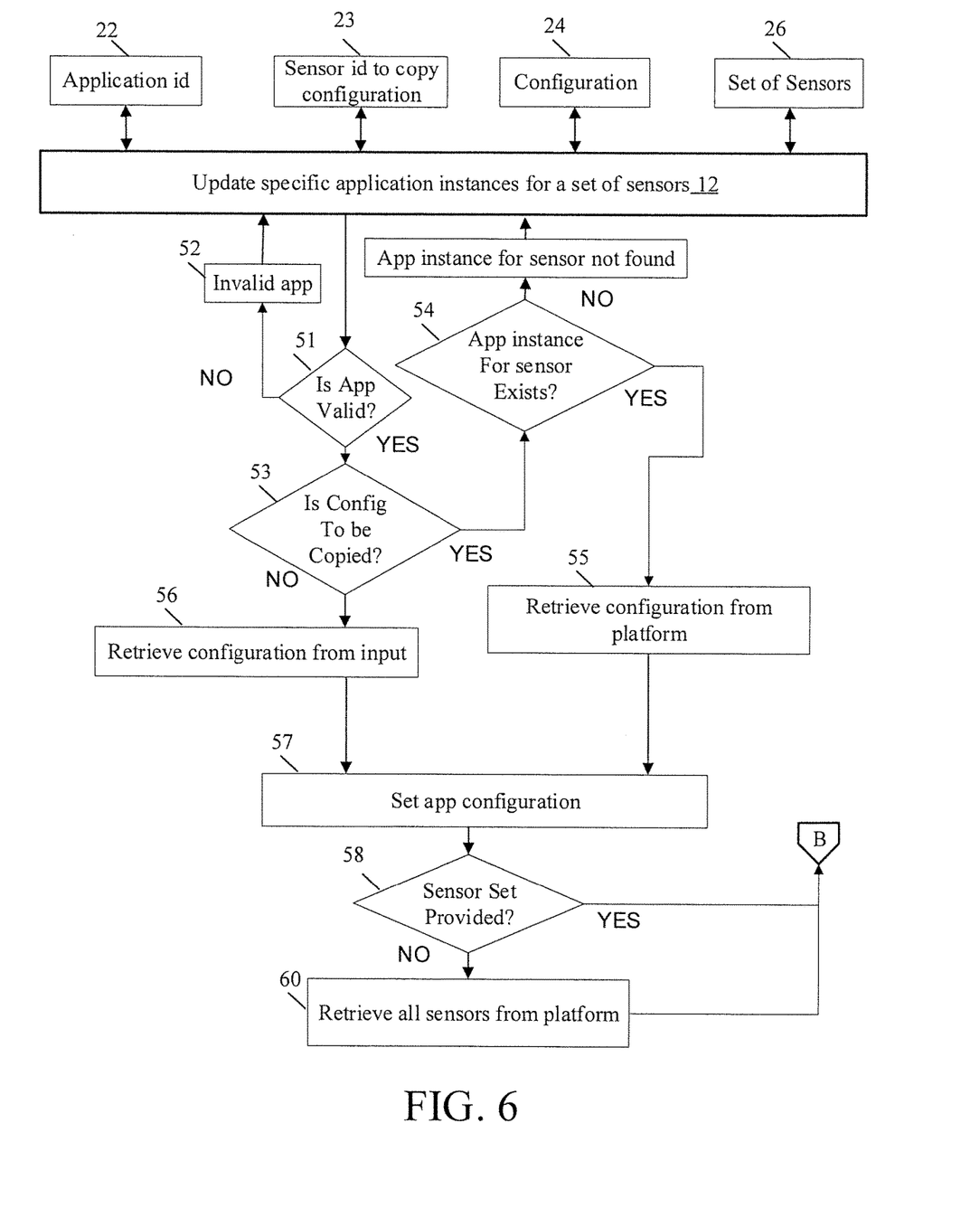
FIG. 6 is part 1 of a flow chart of the execution procedure that is followed by the application updater of the software layer for the system depicted in FIG. 1, in accordance with one embodiment of the present disclosure.
Figure 7:
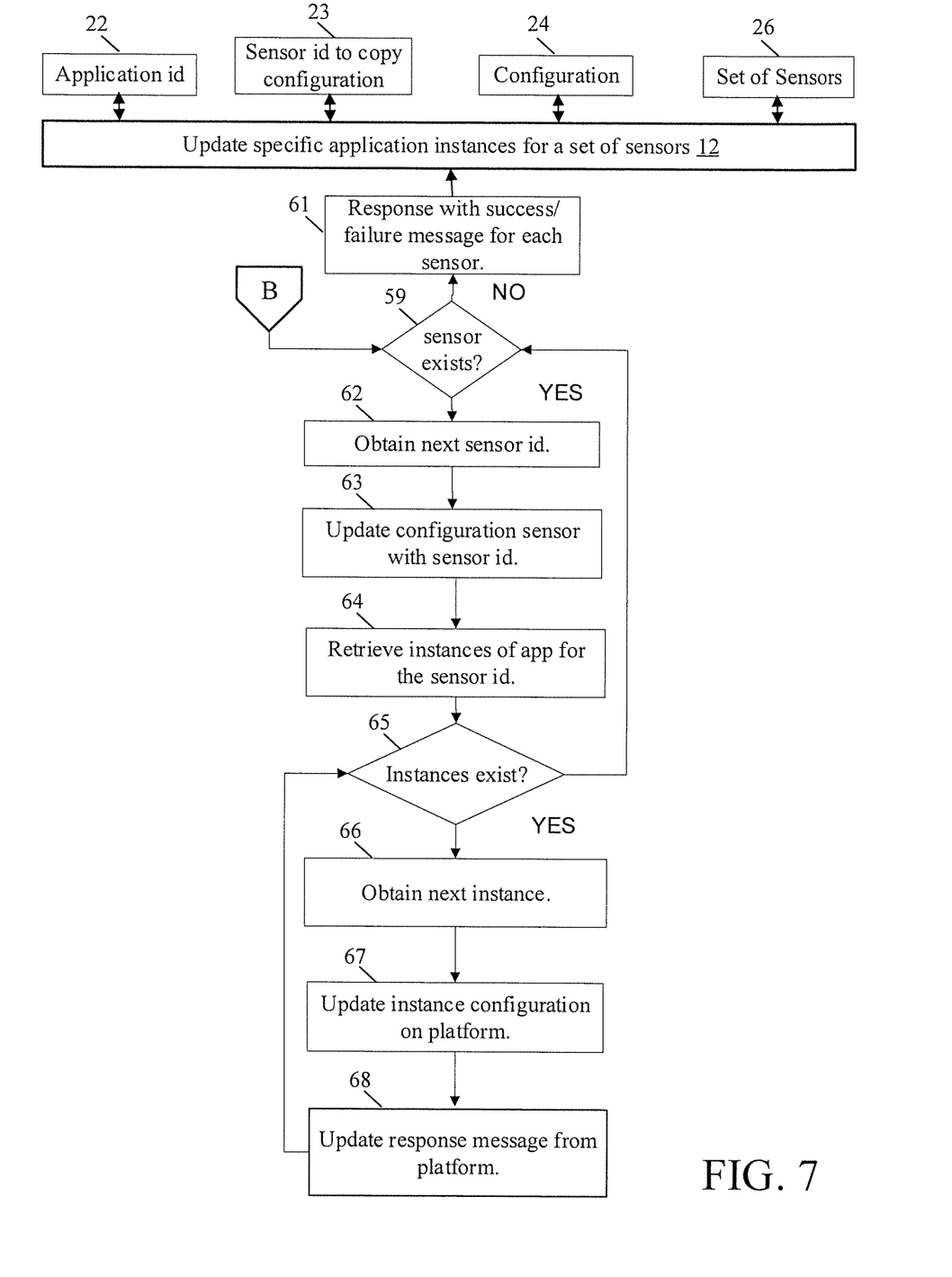
FIG. 7 is part 2 of the flow chart depicted in FIG. 6 for the execution procedure that is followed by the application updater of the software layer for the system depicted in FIG. 1, in accordance with one embodiment of the present disclosure.

FIGS. 6 and 7 illustrates one embodiment of the execution procedure that is followed by the software layer 10, e.g., followed by the application updater 12 of the software layer 10. In some embodiments, the update execution procedure exposes HTTP(S)-based RESTful API to update specific application instances for a set of sensors. The input to the API may include the "Application id" 22, "Sensor id to copy configuration from" 23, "Configuration" 24 and "Set of sensors" 26. Once the input is received, a first check is performed to see if the application is valid or not at block 51. The first check may include checking if the provided "Application id" is loaded in the platform. If the provided "Application id" is not loaded in the platform at block 51, then the request may include an invalid application id and the response is returned with appropriate error message, indicating that the provided "Application id" is invalid at block 52. If the provided "Application id" is valid at block 51, then a check is performed to see if "Sensor id to copy configuration from" is provided or not at block 53.

In some embodiments, if "Sensor id to copy configuration from" is provided, then the platform is checked to see if there is any instance of the provided "Application id" associated with the sensor at block 54. If no instance, or more than one instance is found on the platform, then a response is returned with appropriate error message, indicating that either no or more than one application instance corresponding to the sensor, exists within the platform.

If an instance of the provided "Application id" is found on the platform associated with the sensor id provided in "Sensor id to copy configuration from", then the configuration of the specific instance is retrieved from the platform at block 55.

If "Sensor id to copy configuration from" is not provided at block 53, then "Configuration" from the input is retrieved at block 56.

Referring to block 57 of FIG. 6, in some embodiments, configuration to use to update application instances is set. This could either be copied from an existing instance or could be the one provided with the input.

At block 58 of FIG. 6, in some embodiments, a check is performed to see if "Set of sensors" is provided in the input or not. If it is provided, then our software layer continues to block 59. If "Set of sensors" is not provided, then it is assumed that the operation is to be carried out for all sensors in the platform and all sensors from the platform are retrieved at block 60.

Referring back to block 59, a check is performed to see if there are sensors for which the application instances need to be updated. All sensors are processed one by one until no more exists. When there are no more sensors to process, the process flow continues to block 61 of FIG. 7. The process flow depicted in FIG. 7 continues the process flow depicted in FIG. 6 through page connector "B". Block 61 includes providing a response with a success/failure message for each sensor.

At block 63, a next sensor id to process is obtained from the "set" of sensors, which could be either provided with the input or retrieved from the platform. The configuration to be used for updating the instances is then updated with the selected sensor id at block 63. At block 64, instances of the provided "Application id" associated with the selected sensor id are then retrieved from the platform.

In some embodiments, a check is then performed at block 65 to see if there are instances for which the configuration needs to be updated. All instances are processed one by one until no more instances exist.

Next instance id to process is obtained at block 66. When there are no more instances to process at block 66, the process flow can continue to block 67 of FIG. 7. Configuration of the obtained instance id is then updated with the set configuration (from block 63) on the platform, while retaining the same worker node.

At block 68, a response message is received from the platform 15, e.g., whether the configuration was successfully updated or not is then updated in the final response to be sent. The software layer 10 then continues to block 59. Final response with success/failure message, e.g., whether the application instances were successfully updated or not with details of success/failure for each sensor is then formulated and sent back as response to the request.

Figure 8:
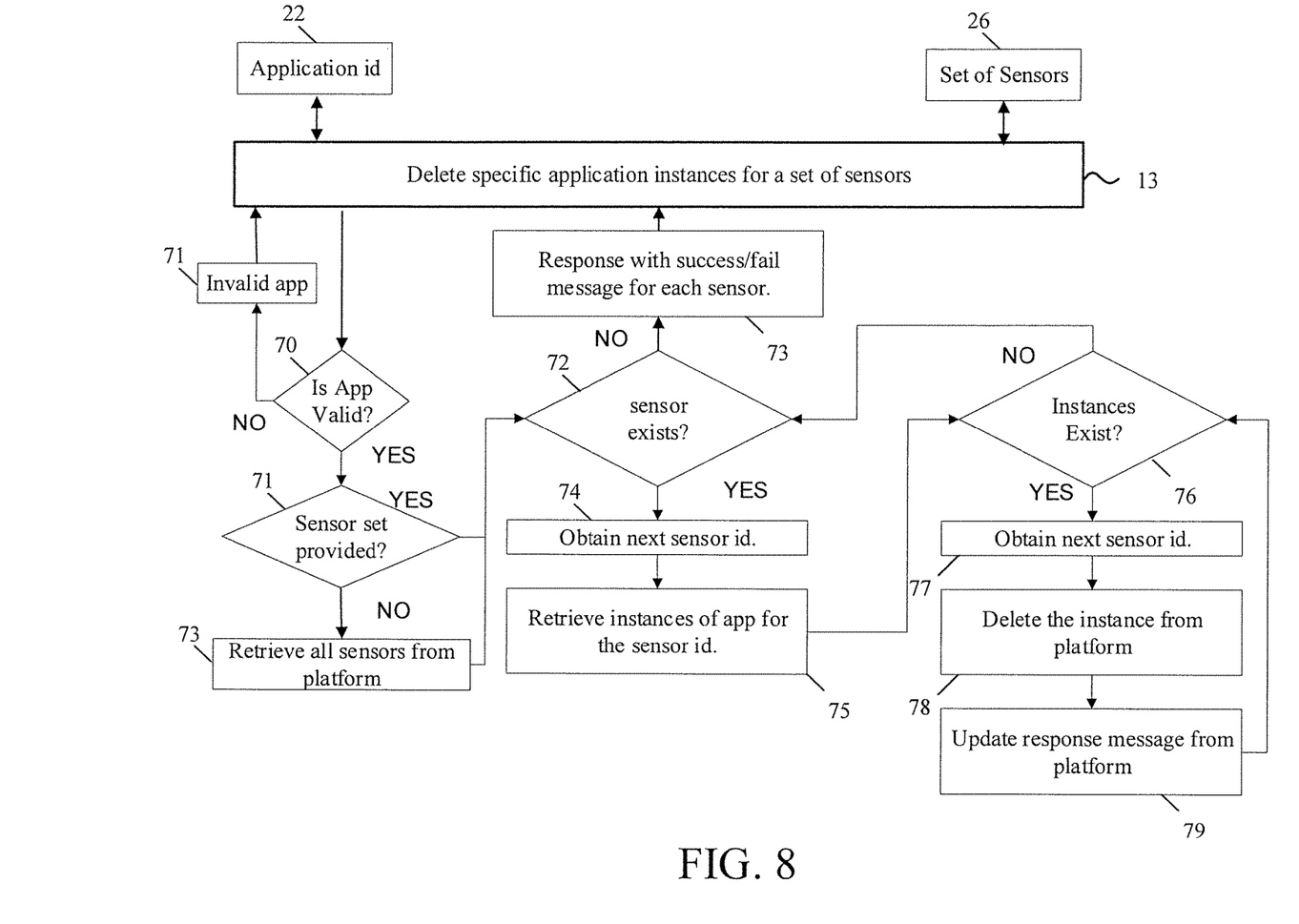
FIG. 8 is a flow chart of the execution procedure that is followed by the application delete of the software layer for the system depicted in FIG. 1, in accordance with one embodiment of the present disclosure.

FIG. 8 illustrates one embodiment of the execution procedure that is followed by the software layer 10, e.g., followed by the application delete 13 of the software layer 10. The software layer exposes HTTP(S)-based RESTful API to delete specific application instances for a set of sensors. The input to the API can include the "Application id" and "Set of sensors". Once the input is received, first check is performed to see if the application is valid or not—by checking if the provided "Application id" is loaded in the platform at block 70. If the provided "Application id" is not loaded in the platform, then the request includes an invalid application id and the response is returned with appropriate error message, indicating that the provided "Application id" is invalid at block 70. If the provided "Application id" is valid, then check is performed to see if "Set of sensors" is provided or not at block 71. If it is provided, then our software layer advances to block 72. If the "Set of sensors" is not provided, then it is assumed that the operation is to be carried out for all sensors in the platform and all sensors from the platform are retrieved at block 73. A check is performed to see if there are sensors for which the application instances need to be deleted. All sensors are processed one by one until no more exists. When there are no more sensors to process, our software layer advances to block 73.

Still referring to FIG. 8, the process continues to block 74 with obtaining a next sensor id to process from the "set" of sensors, which could be either provided with the input or retrieved from the platform.

At block 75, instances of the provided "Application id" associated with the selected sensor id are then retrieved from the platform.

At block 76, a check is performed to see if there are instances which need to be deleted. All instances are processed one by one until no more instances exist. When there are no more instances to process, the software layer 10 advances to block 73.

Next, an instance id to process is obtained at block 77. At block 78, the obtained instance is then deleted from the platform.

A response message from the platform 15, e.g., whether the instance was successfully deleted or not, is then updated in the final response to be sent. The software layer 10 then advances to block 76. The final response with success/failure message, e.g., whether the application instances were successfully deleted or not with details of success/failure for each sensor is then formulated and sent back as response to the request.

Figure 9:
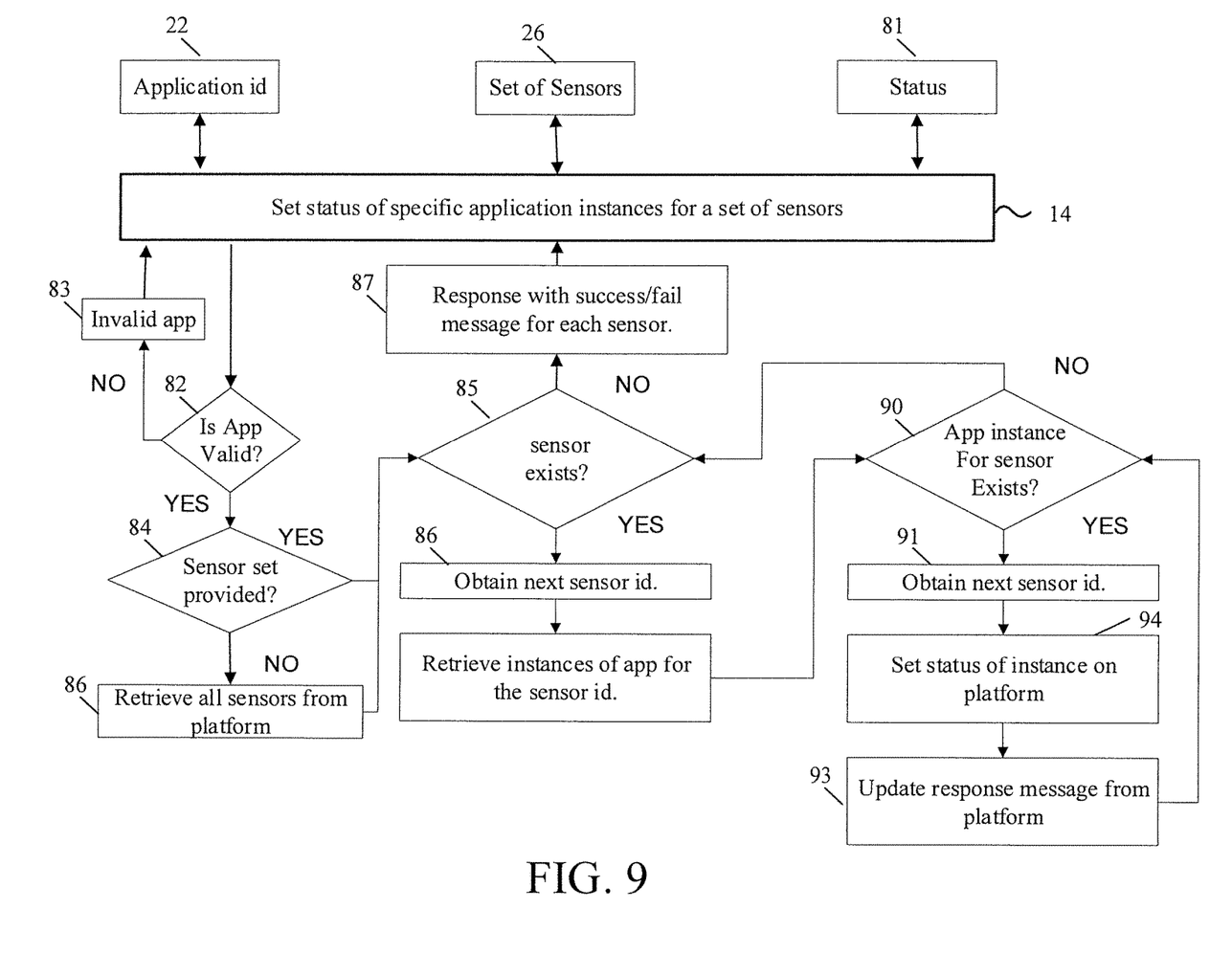
FIG. 9 illustrates an execution procedure to provide a set status functionality by the status setter of the software layer for the system depicted in FIG. 1, in accordance with one embodiment of the present disclosure.

FIG. 9 illustrates an execution procedure followed by our software layer 10 to provide a set status functionality for the status setter 14 of the software layer 10. The software layer 10 exposes HTTP(S)-based RESTful API to set status of specific application instances for a set of sensors. The input to the API can include the "Application id", "Set of sensors" 26 and "Status" 81 to be set for the application instances. This status 81 could either be "start", "stop" or "restart".

Once the input is received, first check is performed at block 82 to see if the application is valid or not. Application validity is checked by checking if the provided "Application id" is loaded in the platform. If the provided "Application id" is not loaded in the platform, then the request includes of an invalid application id and the response is returned with appropriate error message, indicating that the provided "Application id" is invalid at block 83. If the provided "Application id" is valid, then check is performed to see if "Set of sensors" is provided or not at block 84. If it is provided, then the software layer 10 continues to block 85 with a check if a sensor exists for the Application id. If a "Set of sensors" is not provided, then it is assumed that the operation is to be carried out for all sensors in the platform and all sensors from the platform are retrieved at block 86. In some embodiments, a check is performed to see if there are sensors for which the application instances status need to be set. All sensors are processed one by one until no more exists. When there are no more sensors to process, the software layer 10 continues to block 87.

In a following process step, a next sensor id is obtained to process from the "set" of sensors at block 88, which could be either provided with the input or retrieved from the platform. Instances of the provided "Application id" associated with the selected sensor id are then retrieved from the platform at block 89.

A check is performed at block 90 to see if there are instances for which the status needs to be set. All instances are processed one by one until no more instances exist. When there are no more instances to process, the software layer continues to block 85.

At block 91, a next instance id to process is obtained. The status for the obtained instance is then set based on the input to either "start", "stop" or "restart" on the platform at block 92. A response message from the platform, e.g., whether the instance status was successfully set or not, is then updated at block 93 in the final response to be sent. The software layer 10 then advances to block 90.

A final response with success/failure message, e.g., whether the application instances status were successfully set or not with details of success/failure for each sensor, is then formulated at block 93 and sent back as response to the request to the platform 15.

Figure 10:
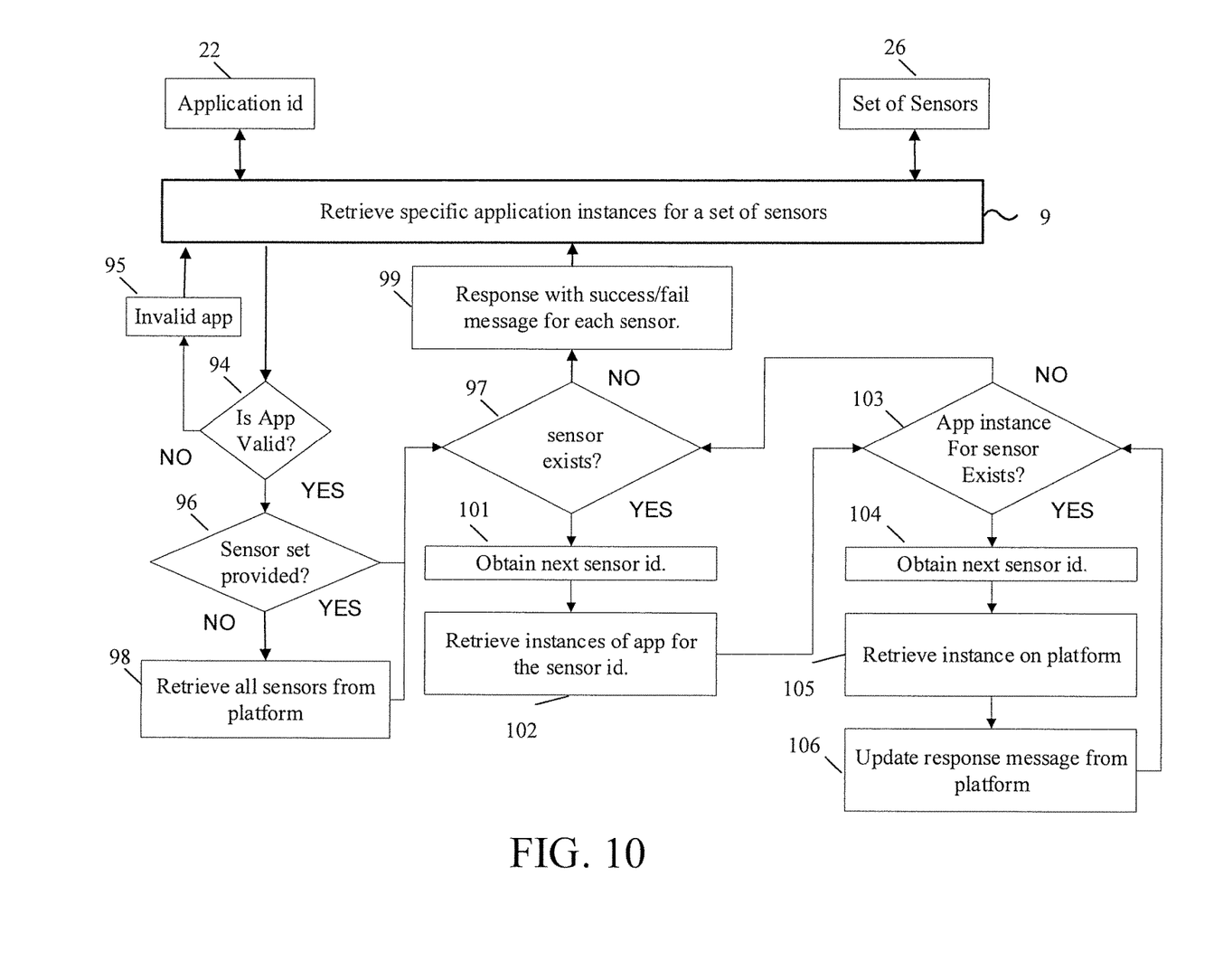
FIG. 10 illustrates an execution procedure to retrieve application instances by the software layer of the system depicted in FIG. 1.

FIG. 10 illustrates an execution procedure followed by the retrieval module 9 of the software layer 10 for retrieving specific application instances for a set of sensors. The software layer 10 exposes HTTP(S)-based RESTful API to retrieve specific application instances for a set of sensors. The input to the API includes the "Application id" 22 and "Set of sensors" 26.

Referring to FIG. 10, once the input is received, first check is performed at block 94 to see if the application is valid or not. This can include checking if the provided "Application id" is loaded in the platform 15. If the provided "Application id" is not loaded in the platform 15, then the request includes an invalid application id, and the response is returned with appropriate error message, indicating that the provided "Application id" is invalid at block 95. If the provided "Application id" is valid at block 94, then a check is performed at block 96 to see if "Set of sensors" is provided or not. If it is provided, then the software layer jumps to block 97.

At block 97 of FIG. 10, if the "set of sensors" is not provided, then it is assumed that the operation is to be carried out for all sensors in the platform 15, and all sensors from the platform are retrieved at block 98. In some embodiments, a check is performed to see if there are sensors for which the application instances need to be retrieved at block 97. All sensors are processed one by one until no more exists. When there are no more sensors to process, the software layer continues to block 99.

Referring to block 101, the next sensor id to process is obtained from the "set" of sensors, which could be either provided with the input or retrieved from the platform 15. Instances of the provided "Application id" associated with the selected sensor id are then retrieved from the platform 15 at block 102. Referring to block 103, a check is performed to see if there are instances to be processed. All instances are processed one by one until no more instances exist. When there are no more instances to process, the software layer 10 advances to block 97.

Next, if an instance for an application exists at block 103, an instance id to process is obtained at block 104. The obtained instance is then retrieved from the platform, including instance details and the status of the instance at block 105. In some embodiments, a response message from the platform, e.g., whether the instance was successfully retrieved or not, along with instance details is then updated in the final response to be sent. The software layer 10 then advances to block 103.

Final response with success/failure message, e.g., whether the application instances were successfully retrieved or not along with instance details, for each sensor is then formulated and sent back as response to the request of the platform at block 106.

The system and methods that have been described with reference to FIGS. 1-10 accept requests for "group" operations, process them by communicating with underlying platform and respond back with success/failure along with details for each item in the "group". The systems and method also manage specific application instances for a set of sensors. The systems and methods described herein can also check validity of application by checking with the underlying platform. In some embodiments, the system and methods that are described herein can create specific application instances for a set of sensors with new configuration. The systems and methods that are also described herein can create specific application instances for a set of sensors by copying configuration of same application instance from another sensor. In some embodiments, the systems and methods update the sensor id in the configuration while creating specific application instances for a set of sensors. The system and method can automatically schedule specific application instances for a set of sensors. The system and method can further select and assign worker nodes for newly created instances; and can select least loaded node for scheduling new application instances. The system and method can further balance workloads across worker nodes. The systems and methods further reduce inter-application communication latency. In some embodiments, the system and method can identify instances that are "shared" across "usecases" and revise scheduling based on co-allocation of "usecase" instances. In further embodiments, the system and methods can update specific application instances for a set of sensors with new configuration. In yet further embodiments, the system and methods update specific application instances for a set of sensors by copying configuration of same application instance from another sensor. The system and methods can also update sensor id in the configuration while updating specific application instances for a set of sensors.

In some examples, the system and methods retain and apply same worker node while updating specific application instances for a set of sensors. In further examples, the system and method can identify specific application instances associated with a particular sensor.

The systems and methods described herein, and start, stop and restart applications sensors for a set of sensors. The systems and methods further have the ability to retrieve specific application instances for a set of sensors. The system and method retrieve specific application instance status for a set of sensors.

Figure 11:
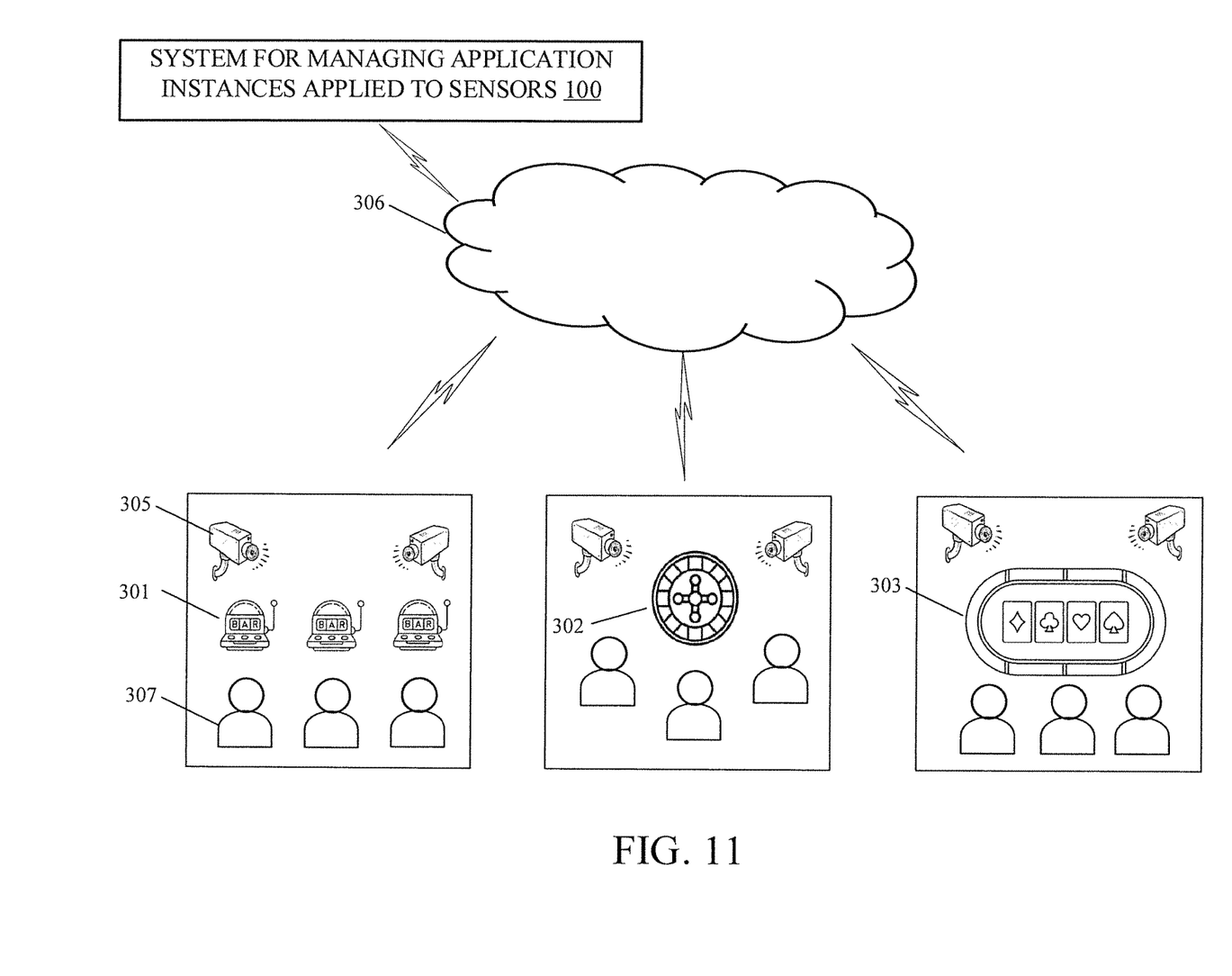
FIG. 11 is an illustration depicting the application of the systems and method described herein to a use case for tracking individuals in a physical space using camera's facial detection and a watchlist, in accordance with one embodiment of the present disclosure.

FIG. 11 illustrates one application of the methods and systems described herein. FIG. 11 illustrates a plurality of sensors that can be used as video cameras 305. The video cameras 305 can be run with specific applications to track individuals 307 through their motions through physical spaces, e.g., 301, 302, 303. In the embodiment depicted in FIG. 11, the different physical spacers 301, 302, 303 may be different regions within a casino having different games. By tracking the individuals 307, the use case can provide an indication of the population density for a particular region of the casino that include a particular game, providing a sense of what games are popular and what games are not popular.

For example, a set of applications employed in a use case for tracking individuals 307 can include an application for determining faces from images taken by the sensors, an application for matching the faces from the images to reference faces in a database, and an application for tracking individual 307 having the faces from the images to matching faces from the reference faces in the databased. For example, the via the platform 15 of the system management system 100, a manager of a property, e.g., a casino, can set a use case for tracking patrons. The use case can be the application of face detection from video frames for matching faces of patrons to a database of patron identities combined with the application of tracking. Or when an individual identity is not known, the application instance can self register an individual. The settings for the application instances applied to a first set of cameras 305 in a first region 301, can be applied to a second set of cameras 305 in a second region 302.

The cameras 305 may be in communication with the system for managing application instances to sensors 100 across a network 306. One or more portions of the network 306 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 306 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for managing applications for sensors comprising:
  loading a plurality of applications and links for communicating with a plurality of sensors on a platform having an interface for entry of a requested use case, the platform including a master node for system level management and worker nodes that are configured for scheduling modification of the application instances being applied to the sensors, the master node determining a presence of shared application instances;
  copying a configuration from a grouping of application instances being applied to a first sensor performing in a function comprising of the requested use case, the copying including scheduling the worker nodes to run the shared application instances in providing services towards the requested use case; and applying the configuration for the grouping of application instances to a second set of sensors to automatically conform the plurality of sensors on the platform to perform the requested use case, wherein applying the configuration of application instances includes co-allocation of the shared application instances on the scheduled working node.

2. The computer-implemented method of claim 1, wherein the co-allocation of shared applied instances on the scheduled working node reduces inter application communication latency for the plurality of applications on the platform.

3. The computer-implemented method of claim 1, wherein a use case is a plurality of applications instances each providing a service that combined provide the function for the use case.

4. The computer-implemented method of claim 1, wherein the copying of the configuration from the grouping of application instances being applied to the first sensor comprises an application manager that manages the plurality of applications of the platform, wherein managing the plurality of applications includes creating application instances for the set of sensors and scheduling updating the application instances for providing the use case.

5. The computer-implemented method of claim 1, wherein the copying of the configuration is provided by an application manager that is in communication with the platform, the application manager having a scheduling function that measures the number of application instances being run across the sensors, and updates sensors to run the application instances being run for the requested use case.

6. The computer-implemented method of claim 1, wherein the copying of the configuration is provided by an application manager that provides functions including creating specific application instances for a set of sensors, updating specific application instances for the set of sensors, setting a status for specific application instances for the set of sensors.

7. The computer-implemented method of claim 1, wherein the plurality of sensors are cameras.

8. The computer-implemented method of claim 1, wherein the use case is tracking individuals in physical spaces.

9. A system for provided for managing applications for sensors comprising:

a platform for storing a plurality of applications and links for communicating with a plurality of sensors, the platform having an interface for entry of a requested use case, the platform including a master node for system level management and worker nodes that are configured for scheduling modification of application instances being applied to the sensors, the master node determining a presence of shared application instances; and an application manager including a plurality of instructions stored on memory for execution by a hardware processor for copying a configuration from a grouping of application instances being applied to a first sensor performing in a function comprising of the requested use case, the copying including scheduling the worker nodes to run the shared application instances in providing services towards the requested use case and applying the configuration for the grouping of application instances to a second set of sensors to automatically conform the plurality of sensors on the platform to perform the requested use case, wherein applying the configuration of application instances includes co-allocation of the shared instances on the scheduled working node.

10. The system of claim 9, wherein the co-allocation of shared applied instances on the scheduled working node reduces inter application communication latency for the plurality of applications on the platform.

11. The system of claim 9, wherein a use case is a plurality of applications instances each providing a service that combined provide the function for the use case.

12. The system of claim 9, wherein the plurality of sensors are cameras.

13. The system of claim 9, wherein the use case is tracking individuals in physical spaces.

* * * * *